Dec. 11, 1951 J. E. LINDBERG 2,577,779
ICING DETECTION DEVICE
Filed Aug. 30, 1947 6 Sheets-Sheet 1
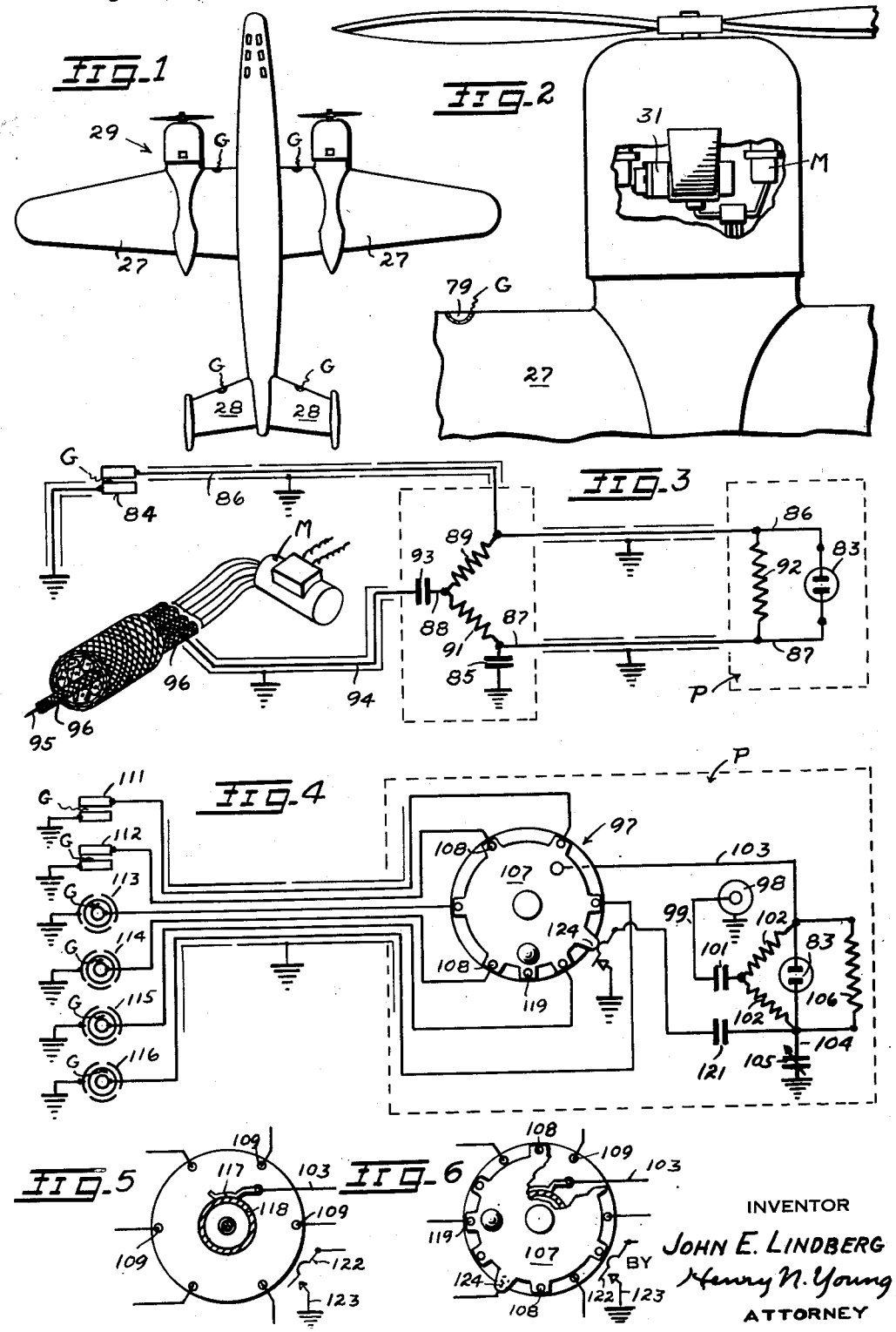
INVENTOR
JOHN E. LINDBERG
BY Henry N. Young
ATTORNEY Dec. 11, 1951  J. E. LINDBERG  2,577,779
ICING DETECTION DEVICE
Filed Aug. 30, 1947  6 Sheets-Sheet 2
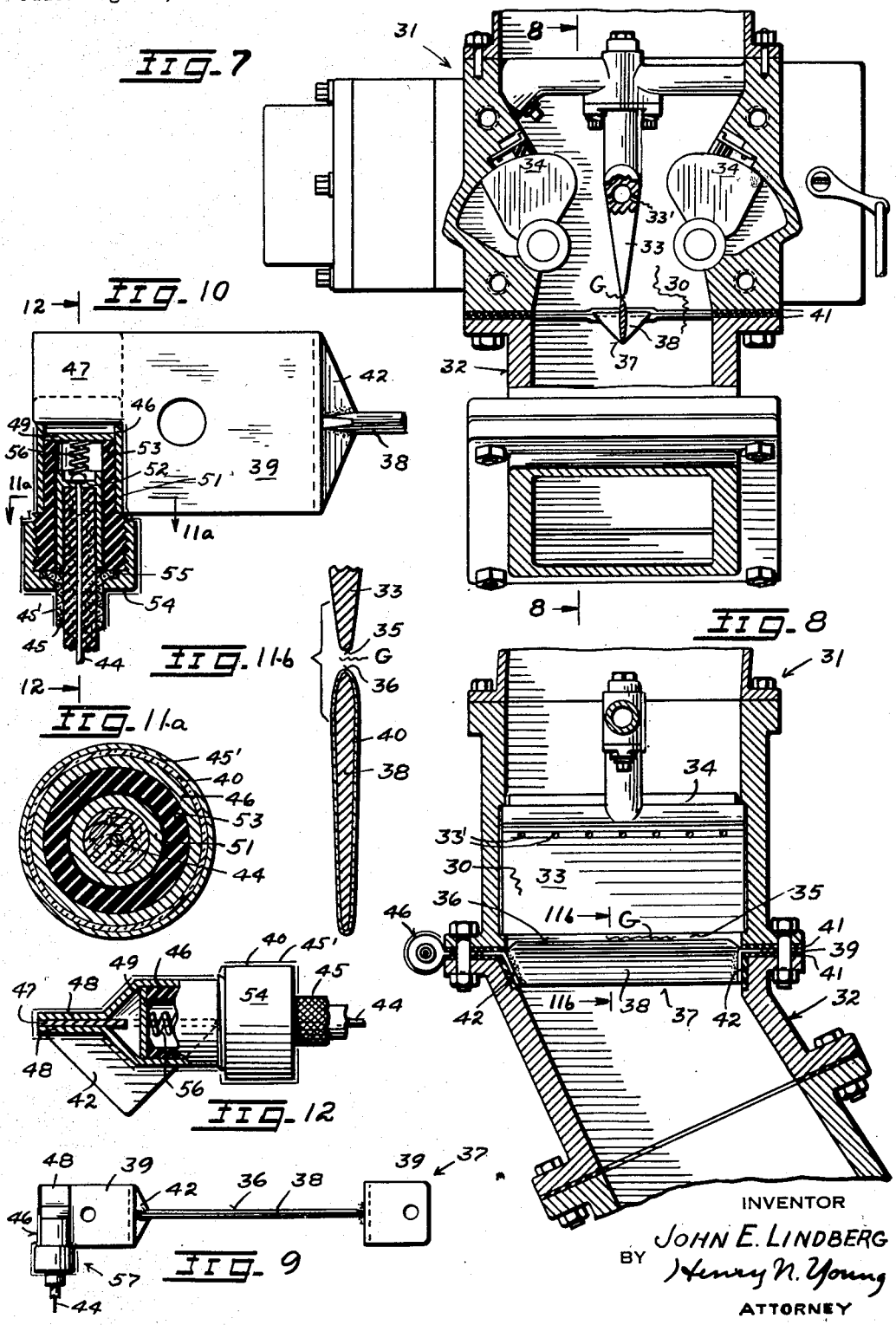
INVENTOR
JOHN E. LINDBERG
BY Henry N. Young
ATTORNEY Dec. 11, 1951     J. E. LINDBERG     2,577,779
ICING DETECTION DEVICE
Filed Aug. 30, 1947     6 Sheets-Sheet 3
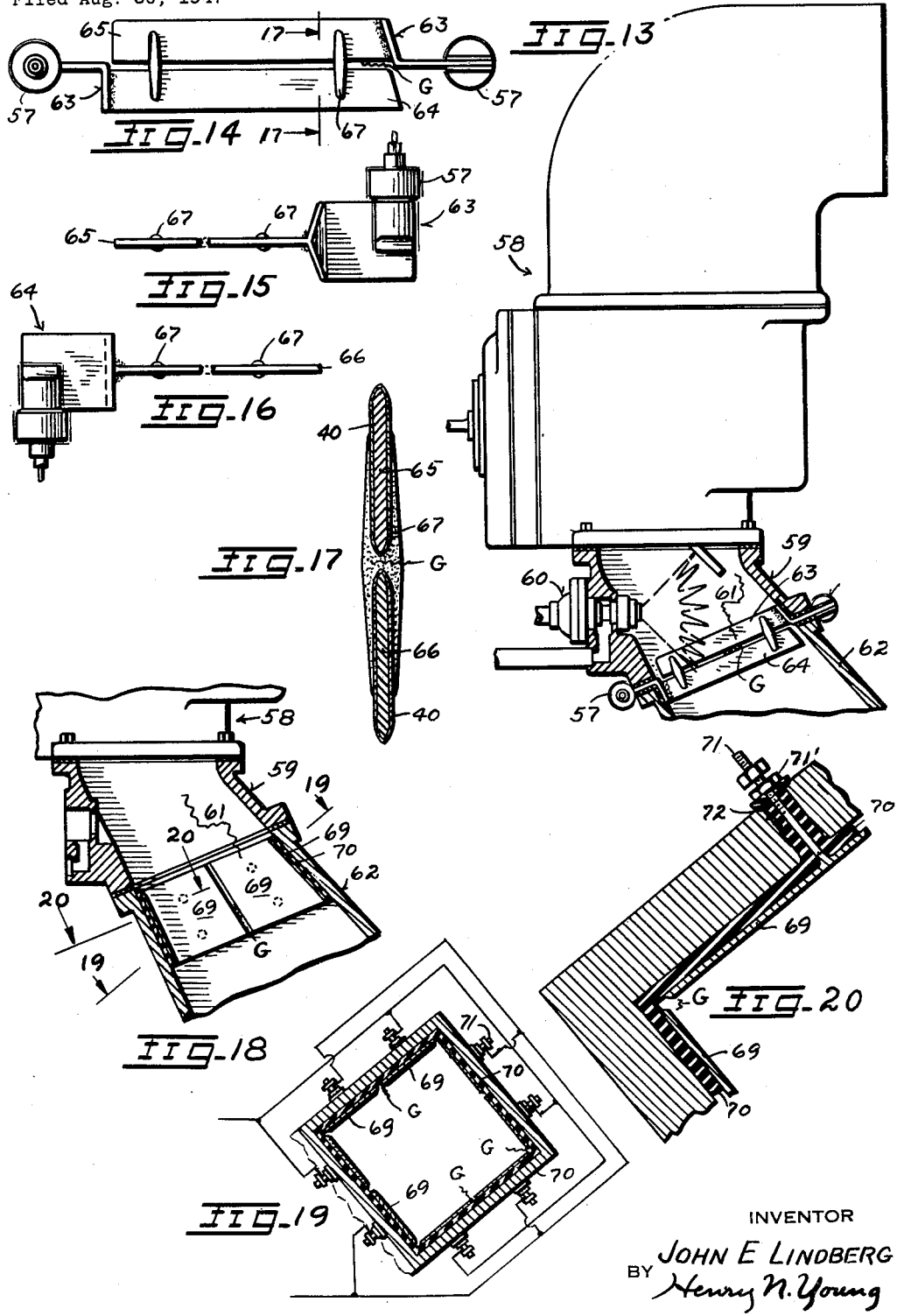
INVENTOR
JOHN E LINDBERG
BY Henry N. Young
ATTORNEY

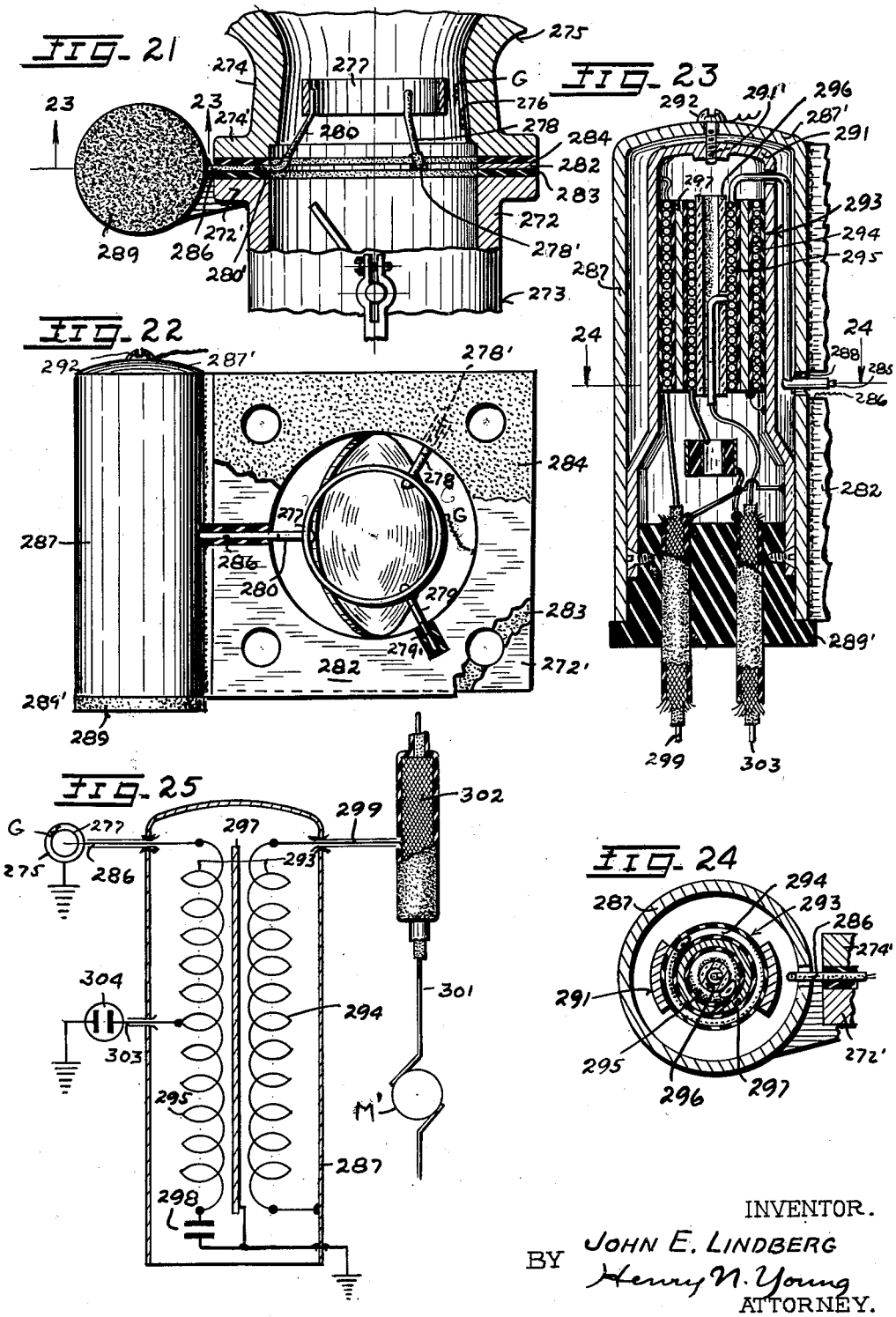

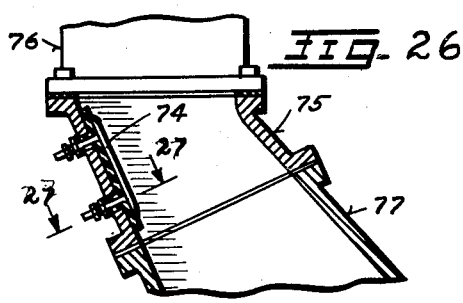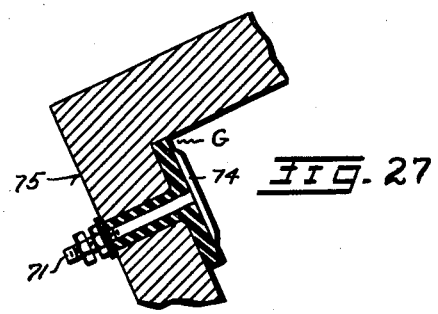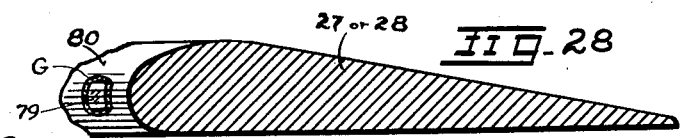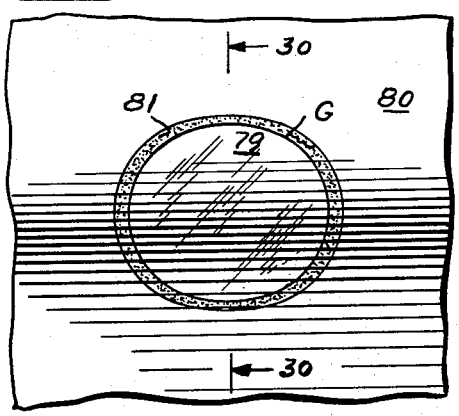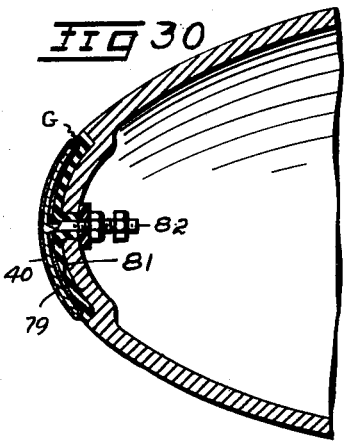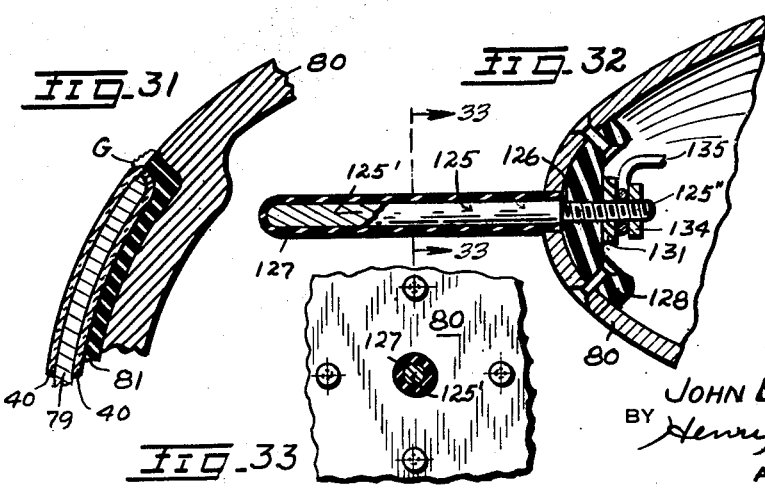

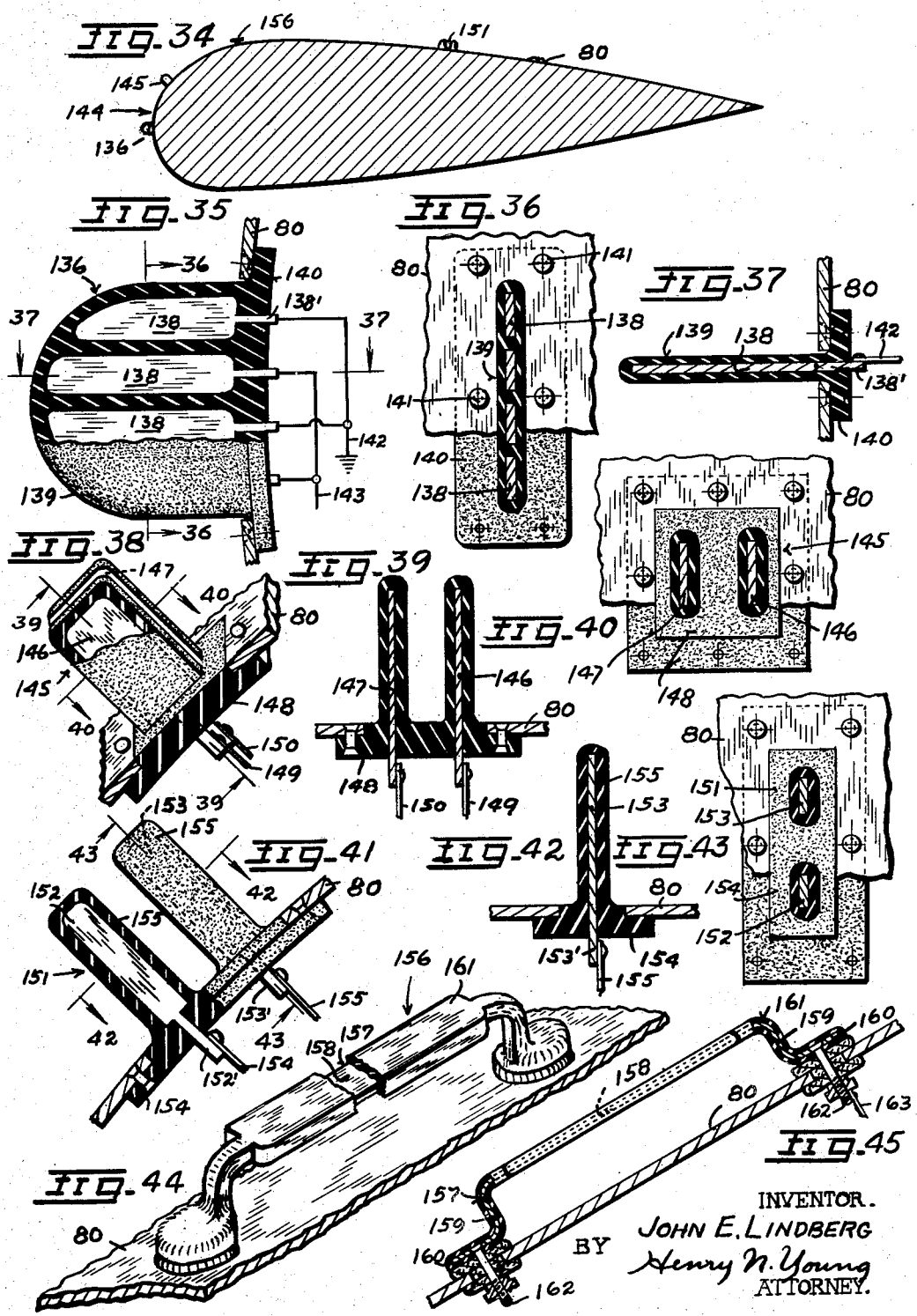

Patented Dec. 11, 1951

2,577,779

UNITED STATES PATENT OFFICE 2,577,779

ICING DETECTION DEVICE

John E. Lindberg, Redwood City, Calif.

Application August 30, 1947, Serial No. 771,533

3 Claims. (Cl. 177—311)

The invention relates generaly to a device for the detection and indication of a deposit of material at a particular location, and more specifically to the formation of ice in fuel induction systems, or on exposed surfaces, of aircraft; the present application comprises a continuation in part of my copending application Ser. No. 473,981, filed Jan. 29, 1943, now Patent No. 2,426,625.

An object is to provide a particularly reliable device for indicating the formation of ice in the fuel induction system of an internal combustion engine, whereby to permit safe engine operation with a full-cold carburetor setting and the accompanying highest engine efficiency and power.

Another object is to provide an improved means for indicating the ice coating of a normally ice-free exposed surface.

A further object is to directly utilize the dielectric qualities of a deposited material as an indicator control means.

The invention possesses other objects and features of advantage, some of which, with the foregoing, will be set forth or be apparent in the following description of typical embodiments of the invention, and in the accompanying drawings, in which:

Figure 1 is a plan view of an airplane having the device of present invention variously applied thereto for the detection of the formation of ice at certain points of the airplane.

Figure 2 is an enlarged fragmentary view of the airplane taken at a propelling motor thereof, a portion of the motor housing being broken away at the engine carburetor and magnetos.

Figure 3 is a schematic diagram showing an indicator circuit and means for the detection of the formation of ice in an engine carburetor, as that of the airplane.

Figure 4 is a schematic showing of a circuit which is usable for the selective indication of the formation of ice in the carburetor or at certain exposed points of an airplane.

Figures 5 and 6 are fragmentary views of a selector switch of Figure 4.

Figure 7 is an enlarged front view of the engine carburetor and its associated adapter, the carburetor having its front side plate removed and the adapter being shown in section.

Figure 8 is a sectional view taken at the line 8—8 in Figure 7.

Figure 9 is a plan view of an electrode member of Figures 7 and 8.

Figure 10 is an enlarged fragmentary view of the electrode shown in Figure 9, a conductor connection therefor being shown in axial section.

Figure 11a is an enlarged fragmentary sectional view taken at the line 11a—11a in Figure 10, thickness being exaggerated.

Figure 11b is an enlarged fragmentary sectional view taken at the line 11b—11b in Figure 8, thickness being exaggerated.

Figure 12 is a partially sectional view taken at the line 12—12 in Figure 10.

Figure 13 is a side view of a different type of carburetor than that shown in Figures 1 and 7 and 8, the adapter portion of this carburetor being shown in section.

Figure 14 is an enlarged view of an electrode member of Figure 13.

Figures 15 and 16 are fragmentary plan views of different elements of the member of Figure 14.

Figure 17 is an enlarged transverse section at the line 17—17 in Figure 14, thicknesses being exaggerated.

Figure 18 is a fragmentary section showing the application of another embodiment of the device to the carburetor and adapter arrangement of Figure 13.

Figure 19 is a transverse section at the line 19—19 in Figure 18.

Figure 20 is an enlarged fragmentary section at the line 20—20 in Figure 18.

Figure 21 is a partly sectional view showing the provision of an ice-affected condenser in combination with a carburetor and the intake manifold of an engine supplied with carbureted fuel from the carburetor.

Figure 22 is a plan view of a unitary condenser plate assembly of Figure 21.

Figure 23 is an enlarged sectional view taken at the line 23—23 in Figure 21.

Figure 24 is a section taken at the line 24—24 in Figure 23.

Figure 25 is a diagrammatic showing of an icing indicator circuit, said circuit being shown as used with the unit of Figures 21 to 24.

Figure 26 is a fragmentary sectional view showing another embodiment of the device as applied to a carburetor adapter.

Figure 27 is an enlarged fragmentary section taken at the line 27—27 in Figure 26.

Figure 28 is a fragmentary section showing the application of a different form of the device at the leading edge of an airplane wing or stabilizer.

Figure 29 is an enlarged front view of the showing of Figure 28.

Figure 30 is a section at the line 30—30 in Figure 29.

Figure 31 is an enlarged fragmentary view of the showing of Figure 30, thicknesses being exaggerated.

Figure 32 is a fragmentary section corresponding to that of Figure 30 and showing a different embodiment of the device provided at the leading edge of an airfoil.

Figure 33 is a sectional view taken at the line 33—33 in Figure 32.

Figure 34 presents an airfoil section showing different icing detection condensers of my device applied at different positions thereon.

Figure 35 is a side view of a different form of icing detection condenser mounted on the skin of an aircraft.

Figures 36 and 37 are views taken at 36—36 and 37—37 in Figure 35.

Figure 38 is a partly sectional perspective view showing a mounted icing detection condenser of another structure.

Figures 39 and 40 are views taken at 39—39 and 40—40 in Figure 38.

Figure 41 is a partly sectional side view of yet another icing detection condenser of my invention.

Figures 42 and 43 are views taken at 42—42 and 43—43 in Figure 41.

Figure 44 is a perspective view showing yet another installed icing detection condenser arranged of my invention.

Figure 45 is a longitudinal section of the structure of Figure 44.

As disclosed, the device of my invention is applied for the detection of the formation of ice in the induction passage of an internal combustion engine and on the wings 27 and stabilizers 28 of an airplane 29. Essentially, the device comprises the provision of a special gap between capacity electrodes provided in a high-frequency circuit including a suitable indicator means which is actuatable by a change in the dielectric conditions across said gap. In the present application of the device, the indicator means is arranged to be actuated by and upon a formation and/or deposit of ice in a gap G provided between capacity electrodes suitably provided at a circuit point in a zone normally containing only gaseous material including water vapor and where the formation of ice may be expected to first occur under icing conditions; for descriptive convenience, the gaps G are herein referred to as "dielectric gaps."

Figures 7 to 12 disclose the provision of a dielectric gap G within a discharge passage 30 of a carburetor 31, said passage being defined in part within a usual tubular adapter 32 through which the carbureted fuel is conveyed to the intake manifold of its engine. The present carburetor 31 is of the type in which a wedge-shaped fuel discharge nozzle 33 is disposed between Venturi throttle members 34 which are swingably adjustable about axes parallel to the nozzle plane to provide an adjustable air flow passage along the nozzle toward its apical edge 35, the fuel being supplied in said passages through usual ports 33' of the nozzle. The generally disclosed carburetor 31 is of the "Holly" aircraft type, and is bolted upon the adapter 32, the plane of connection of the carburetor and adapter being adjacent the straight nozzle edge 35.

In the present arrangement, the nozzle 33 is utilized as a plate or electrode defining one side of a dielectric gap G, and a member 37 provides the other electrode of the gap. As shown, the member 37 includes a generally flat strip 38 of electrically conductive material for spanning the passage 30 in the plane of the nozzle 33 with its upper edge 36 in spaced parallel relation to the nozzle edge 35 to define the dielectric gap G between said edges. The connection between the carburetor and adapter may be utilized for mounting the member 37 in its operative position by providing the member with flat extensions 39 in the form of end flanges for gripped engagement between the opposed faces of the carburetor and adapter. The flanges 39 may be perforated to freely receive the connecting bolts therethrough, and may be engaged between gasket members 41 of insulating material at the connection.

In the present structure of the member 37, the end flanges 39 are provided by members having inner end portions 42 triangular and downturned to generally parallel the opposed faces of the adapter passage thereat, and have the plate-like electrode 38 fixed integrally to and between the portions 42 in a suitable manner. The plate element 38 is preferably of streamline cross-section with the edge 36 its leading edge whereby to minimize frictional resistance to the flow of the fuel mixture in the passage 30. Noting that the member 37 provides one side of a dielectric gap G in a high-frequency indicator circuit, it is desirable that this member be particularly well insulated, and to the latter end, the member is preferably completely coated with a relatively thin layer 40 of an insulating material having a highly capacitative dielectric constant, a ceramic, or porcelain, glazing being a preferred coating; the provision of the coating 40 is brought out in Figures 11a and 11b.

Understanding that the leads of a high-frequency circuit to include the gap G should also be insulated or shielded against electrical interference, as by a grounded tubular metal shield or shroud 45, the connection for a lead 44 to the member 37 is such as will maintain the desired insulation condition thereat. As particularly shown, a metallic member 46 is provided for mounting on an extension 47 of a flange 39, said extension comprising an integral continuation of the flange, but extending for only approximately one-half of its width. The member 46 is shaped as from a piece of tube which is flattened for a portion of its length and has its flattened portion cut off in the line of the cylinder of its unflattened portion to provide lips 48 for receiving the extension 47 between them, the member 46 being integrally fixed to the flange in a suitable manner, as by welding at the line of engagement of the members. At the inner end of its tubular portion, the member 46 is partitioned by a metallic disc 49 fixed therein and arranged to provide the contact point with the member 37 for the lead 44. Except for a limited central contact zone at the outer face of the disc 49, the disc and member 46 have the glazed insulating coating 40 of the rest of the member 37.

For providing an electrical connection of the lead 44 with the disc 49, a cap-like metallic member 51 is mounted at the end of the lead to receive the insulation for the wire and has its closed end 52 perforated for receiving a bared end portion of the lead wire therethrough for soldering in place thereat, said member being disposed slightly inwardly of the adjacent extremity of the cap. The cap member 51 is slidably engaged in a sleeve member 53 of insulating material having an inner portion thereof arranged for fixed insertion within the tubular portion of the member 46 to engage the disc 49 and having its extended portion externally threaded to mount a ring cap 54 arranged to receive the shroud 45 of the lead 44 through its opening.

In connecting the lead to the member 37, the shielding shroud 45 is turned outwardly adjacent the outer end of the cap member 51 to provide a radial flange 55 about the lead and its insulation thereat, and the flange 55 is arranged for clamped engagement between the opposed faces of the sleeve 53 and the ring cap 54 to fix the shroud and lead to the member 46. A compression contact spring 56 is seated between the disc 49 and the cap end 52, the screwing down of the cap 54 being arranged to compress the spring 56 in its place to provide a direct electrical connection between the disc and cap end; in this manner, a sealed-in connection 57 is provided between the lead 44 and electrode member 47. Before the cap 54 is applied, the porcelain-coated extending portion of the member 37 is preferably overcoated with metal, as by applying a metallizing spray thereto, to provide, in effect, an extension 45' of the shielding shroud 45 over the exposed portion of the member 37 when the ring cap 54 is operatively installed.

Figures 13 to 17 disclose a means for providing a dielectric gap G in connection with a downdraft carburetor 58, such as a "Stromberg" injection carburetor, having the spray discharge of fuel taking place obliquely into an adapter 59 from a nozzle element 60 in such a manner that the evaporation of the fuel takes place adjacent the discharge end of the adapter passage 61. The lower end of the adapter 59 is arranged for bolted connection to the intake nozzle 62 of the engine to be supplied with carbureted fuel, and electrode members 63 and 64 providing the present gap G between them are arranged for mounting across the passage 61 and its continuation in the manifold 62 at the juncture of the adapter and the manifold nozzle. As particularly shown, each electrode 63 and 64 generally resembles an electrode 37 of the first embodiment except that only one end thereof provides a flange for gripping between the exposed adapter and nozzle ends. At the flanged ends thereof, the electrodes 63 and 64 are preferably provided with a lead connection 57 such as that provided for the electrode member 37.

Noting that the plates 65 and 66 of the electrodes 63 and 64 respectively are secured only at one side of the passage 61, and comprise relatively thin elements in mutually coplanar relation while providing a uniform gap G between their opposed edges, means are preferably provided to mutually secure the plates in such unitary relation as to avoid flutter of the plates in the stream of carbureted fuel, whereby the associated electrodes comprise a two-electrode unit. As illustrated, the plates 65 and 66 are connected with each other near their different ends with ribs 67 of suitable insulating material, and the complete two-electrode unit is preferably fully coated with a ceramic glazing 40 for preventing an electric leakage to or from the electrodes. It will be understood that the present electrode unit is adapted for inclusion in an ungrounded circuit, or in a grounded circuit by grounding one electrode, whereas the previously described electrode 37 is arranged for inclusion in a circuit with the grounded carburetor nozzle. In the latter connection, it will be understood that the electrode members 37 are readily adaptable for mounting in pairs between the adapter 61 and nozzle 62 to provide the operative equivalent of the gap-providing unit 65—66 thereat.

Figures 18 to 20 disclose gap-providing electrodes arranged around the sides of the passage 61 instead of across said passage. As particularly illustrated, a series of electrode plates 69 is mounted within the upper end of the manifold nozzle 62, with the plates 69 laterally spaced to provide dielectric gaps G between their adjacent edges. At the plates 69, the sides of the passage 61 are lined with insulation 70, and said plates are provided with securing bolts 71 for extension through holes 72 in the nozzle sides, said holes being lined with insulation sleeves which sealedly receive the bolts 71 therethrough. Nuts 71' engage the outer ends of the bolts 71 for clamping the electrode plates 69 in their places, and one bolt for each plate is used as a binding-post connection for the plates. The electrodes 69 would preferably be coated with a ceramic glaze 40, or other suitable insulation, as before.

Figures 21 to 25 inclusive disclose an arrangement for providing a dielectric gap G in connection with the discharge nozzle 272 of an updraft carburetor 273, said nozzle being of circular cross-section and terminating in a rectangular connection flange 272' by which it may be connected to a complementary connection flange 274' of the intake nozzle 274 of the manifold 275 which distributes the carbureted fuel from the carburetor. The carburetor and manifold may be of any suitable structure and are deemed to be represented by the nozzles 272 and 274 respectively.

The bore 276 of the nozzle 274 tapers somewhat from the flange 274', and the surface of this bore is arranged to be used as one electrode of a gap G. The other electrode of the present gap G comprises a metallic ring 277 of uniform cross-section supported within the tapered portion of the bore 276 in coaxial relation therewith, and is connected in a suitable indicating circuit which is arranged to indicate the deposit of ice in the axially tapered gap G defined between the electrode 277 and the nozzle bore 276. The present gap form with respect to the flow of carburetted fuel is understood to insure a building up of any deposit of ice therein from its discharge end rearwardly toward the carburetor.

As particularly shown, the ring electrode 277 is carried on three legs 278 and 279 and 280 extending generally axially therefrom to radial foot portions 278' and 279' and 280' which are secured to a rigid plate member 282 in insulated relation thereto, said plate being arranged for mounted insertion between the nozzle flanges 272' and 274', and being provided with a central opening for registration with the nozzle bores. Gaskets 283 and 284 of suitable insulating material are interposed between the plate 282 and the nozzles 272 and 274 respectively, and the plate 282, which may be of metal, is notched out to receive the feet 278' and 279' and 280' of the electrode-supporting legs 278 and 279 and 280, the arrangement being such that the gaskets 282 and 284 may retainedly grip the different feet between them while the electrode 277 is insulated from the plate.

While the legs 278 and 279 for the electrode ring 277 serve only to support the ring in its operative position, the support leg 280 is connected to a conductor 286 for including the electrode in an indicator circuit, and extends laterally from an edge of the plate 282 for this purpose, the leg portion at the plate and the associated conductor 286 being disposed in a radial slot 285 extending through the plate from the central plate opening to said plate edge in insulated relation to the plate. The foot portion of the leg 280 and the conductor may be enclosed in insulating sheaths, if desired.

Figures 26 and 27 disclose an arrangement in which a single plate 74, which is insulated and formed generally as an electrode plate 69 of the embodiment of Figures 18 to 20, is mounted on a wall of an adapter 75 connecting a carburetor 76 with an intake nozzle 77. The gap G, in this instance, is provided between an edge of the electrode plate 74 and the side of the fuel passage which intersects the wall on which the electrode 74 is mounted.

Since, under certain weather conditions, ice may form and accumulate as a deposit upon the exterior surfaces of aircraft, the present invention contemplates the provision of the present ice detection device at those points on exposed aircraft surfaces where the formation of ice is apt to first occur. As applied to the airplane 29, external points where ice deposits may be expected to first occur under icing conditions are, for instance, at the leading edges of the wings 27 and the stabilizers 28, and, as indicated in Figures 1 and 28 to 31, dielectric gaps G are accordingly provided at points on the leading edges of the wings and stabilizers. In the present instance, electrode plates 79 of more or less circular outline are provided at the said leading edges of the wings and stabilizers for providing the desired dielectric gaps G between their peripheral edges and the metal shell or skin 80 of the part which mounts the electrode, the arrangement being target-like in appearance.

As particularly illustrated, the surface of the shell 80 is countersunk to complementarily receive an electrode 79 and a layer of insulation 81 between the electrode and shell, the arrangement preferably being such that the exposed face of the electrode 79 is generally flush with the shell surface adjacent its edges and a dielectric gap G is provided from its periphery over the exposed edge of the insulation 81. The electrode 79 is preferably provided with the ceramic coating 40 of the previously described electrodes, a mounting bolt 82 extending inwardly from a central point of the electrode through the shell and serving as a binding-post in a circuit including the electrode. With this construction, the shell 80 would be part of a grounded circuit providing a gap G over the annular exposed face portion of the insulation 81.

In practice, certain difficulties have been found in connection with the operation of dielectric gaps of the flush type shown in the embodiment of Figures 28 to 31. One noted difficulty with flush type gaps is that which arises when the skin surface of an aircraft provided with this type of icing detection device is temporarily heated for de-icing purposes while icing conditions prevail; undetected ice may remain to provide a bridge over the ungrounded element whereby the addition of ice to the bridge will not be detected. Experience has shown that the foregoing and other disadvantages of the flush type may be largely eliminated by projecting at least one electrode of an ice detecting condenser device outwardly from the skin of an aircraft in several satisfactory manners having certain distinct advantages in the icing-detection art.

As particularly shown in Figures 32 and 33, a condenser element in the form of a round rod is extended transversely forwardly from the nose face of an airfoil as comprising the ungrounded element of an ice-detecting condenser of the present type. An inner end portion of a rod 125 is reduced and threaded to provide a shoulder 126 at the juncture of its threaded and unthreaded portions 125'' and 125', and the rod portion beyond the shoulder 126 is provided with a coating 127 of glass or other suitable insulation. A base block 128 of insulation is fixed to the skin 80 of the aircraft, as by riveting, and is provided with a transverse opening which freely receives the threaded rod portion 125'' and registers with an opening through the skin, the latter opening closely receiving the base part of the coated rod portion 125'. A nut 131 mounted on the inner rod portion 125'' is operative against the block 128 to removably clamp the rod 125 in place on the block for its rigid extension from the aircraft skin thereat, and a second nut 134 on the rod portion 125'' may provide a binding post connection for a wire 135 thereat. It will be understood that the protruding rod portion 125' is arranged to function as the ungrounded element of a condenser in the manner of the element 79 of the flush type condenser device of Figures 28 to 31, and that any ice formation will occur generally conically about the rod 125 and progressively from its base to provide a dielectric change for actuating an indicator circuit in which the rod and skin are included.

Figures 35 and 36 and 37 disclose a condenser assembly 136 in which a plurality of condenser plates 138 are embedded in mutually coplanar and laterally spaced relation in a fin-like portion 139 of a body of insulation having a base portion 140 transverse to the portion 139, the base having its outer face arranged for flat fitted and fixed engagement against the inner side of the skin 80 while the portion 139 extends through a complementary slot in the skin; rivets 141 may fix the fitted base 140 in place on the skin. Stem-like extensions 138' of the plates 138 extend through the base 140 to alternate connections in their order with wires 142 and 143; the wire 142 may be grounded, while the wire 143 is connected in an icing-detection circuit, or vice versa. It will be understood that ice forming on the flat sides of the transversely extending element assembly of the condenser unit 136 will effect a dielectric bridging between adjacent plates for influencing an indicating circuit including the assembly. A present condenser assembly 136 is shown as mounted at the forward nose position of the airfoil 144 shown in outline in Figure 34.

Figures 38 to 40 inclusive disclose another condenser unit as installed on an exposed surface subject to icing conditions; in the present illustrated unit 145, condenser plates 146 and 147 extend through and from a base block 148 of suitable insulation material and are in mutually opposed relation. The present structure is disclosed as having the extending portions of the plates 146 and 147 mutually parallel, but these plates may be in mutually diverging or mutually converging relation, if desired. The extending portions of the condenser elements 146 and 147 are preferably enclosed in coatings of insulation which may comprise integral continuations of the base 148, and inwardly extending ends of the elements 146 and 147 provide connections for wires 149 and 150 by which the unit may be connected in a suitable indicator circuit. It will be understood that the formation of ice between the plates 146 and 147 influences the ice detection circuit including them. The present block 148 is of transversely stepped structure to provide a smaller outer block portion which fits a complementary opening in the skin 80 to which its larger inner part is riveted. The installation of a present unit 145 is indicated in Figure 34 at an airfoil position intermediate the leading and highest points of the airfoil.

Figures 41 to 43 inclusive disclose a condenser unit 151 in which condenser plates 152 and 153 extend from a base block 154 in mutually coplanar and laterally spaced relation. The block 154 is of insulation material, and the extending portions of the elements 152 and 153 have mutually independent insulation coatings 155 which are shown as comprising extensions of the material of the block 154. The block 154 is stepped inwardly from its outer face to provide a block portion which fits a complementary opening in the skin 80 while disposing an inner flange portion of the block opposite the skin for riveting thereto. Stem extensions 152' and 153' of the elements 152 and 153 anchor the elements in the block and extend inwardly of the block to connections with wires 154 and 155 by which the elements may be included in an ice detection circuit. It will be understood that the formation of ice in the space between the insulated elements 152 and 153 in their plane will influence the indicator circuit for indicating its presence. A satisfactory use positioning of a condenser unit 151 midway of the top of the airfoil 144 is indicated in Figure 34.

Figures 44 and 45 disclose a unit 156 in which an ungrounded electrode 157 for an ice detection circuit essentially comprises a flat metallic band disposed opposite and parallel to an aircraft surface in a position for the flow of air between it and the skin 80 while the aircraft is in flight. As particularly shown, the element 157 may be formed of a single strip of metal formed to provide a transverse U-band with mutually outturned base feet at its end portions, whereby the element comprises an intermediate portion 158 supported by and between stem portions 159 from which foot portions 160 extend. The element part 158 comprises the condenser electrode portion of the element and may be somewhat wider than the other parts, as is shown. In the present instance, the element 157 is shown as being provided with a complete insulation coating 161, but such coating might be omitted at the electrode part 158, if desired. Bolts 162 in electrical contact with the element 157 at the feet 160 extend through the aircraft skin 80 for securing the element in place across the line of flow of air over the airfoil surface; a mounting of a present unit 156 at the highest point of an airfoil is indicated in Figure 34. The bolts 162 are suitably insulated from the skin at the holes through which they extend, and either of them may be used as a terminal for connecting the element in an indicating circuit by means of a conductor 163.

By particular reference to the airfoil outline of Figure 34, it will be understood that ice detection condensers of the present type may be provided generally at any surface point where the likelihood of ice formation exists, and that the embodiments of Figures 32 to 45 inclusive will function generally more effectively than will flush type arrangements at airfoil points other than the leading point; at least the arrangements of Figures 32 to 43 inclusive will, however, generally function better than the flush type at leading airfoil points.

It will now be recalled that the plate 282 of the electrode assembly of Figures 21 to 23 inclusive mounts certain elements of an indicator circuit for actuation in accordance with the formation of ice in the gap G between the bore 276 and the outer face of the ring electrode 277, said circuit differing from, and having certain advantages over, the circuit of Figure 3. As particularly shown, a tubular shell 287 of metal is fixed to and along the edge of the plate 282 from which the conductor 286 extends, and receives said conductor through a side opening 288 therein. The present shell 287 extends for the full length of the plate side at which it is fixed, and has a closed end 287', the other end of the shell being closable by a snugly fitting plug 289.

The plug 289 closely and slidably fits the bore of the shell and is provided with a radial flange 289' at its outer end for limiting its movement into the shell. A rigid band loop 291 of metal or other suitable material extends from the inner end of the plug, and is provided at its bend with a threaded hole 291' for receiving a screw 292 extending through the shell end 287' for screwing into the nut to draw the plug into limiting position in the shell space. If, as indicated, the shell is of metal, and is used as a grounding element, the screw 292 may also be utilized to provide a positive grounding connection for the combination of the plate and shell.

It will now be noted that the inner portion of the member 291 mounts a transformer 293 having a primary coil 294 and a secondary coil 295 and a core 296 in order; it will usually be preferable that the core 296 be of non-magnetic material. It is particularly necessary that capacity effects be avoided between the coils 294 and 295, and to that end a split metallic sleeve 297 is interposed as an electrostatic shield between the coils and is grounded to the shell. The conductor 286 from the ring electrode 277 is connected to one terminal of the secondary coil 295 and a balancing condenser 298 is mounted between the transformer assembly and the plug 289, and has its different plates connected respectively to a terminal of the transformer secondary and to the shell.

Power for energizing the primary coil 294 is derived by induction from a source of oscillating power such as an ignition wire 301 which is periodicaly energized by a magneto M' of the engine supplied with carbureted fuel by the carburetor 273; for present power pick-up purposes, a power lead 299 may connect one terminal of the primary coil with a tubular metallic sleeve 302 enclosing, and insulated from, a portion of the wire 301, said sleeve being ungrounded and being insulated against moisture. The other terminal of the primary coil 294 is grounded as to the shell 287. A conductor 303 extends from an intermediate point of the secondary coil 295 to one terminal of a neon glow lamp 304 disposed in position for observation by an operator of the aircraft and having its other terminal grounded.

It will now be noted that if the capacitances of the secondary circuit portions at opposite sides of the point of connection of the conductor 303 are made equal, said lamp connection point is at zero potential with respect to ground, and the lamp 304 will not then be energized for its glowing as an indicating means. If, however, ice forms in the gap G, the resulting increase in capacitance in that portion of the secondary circuit to a sufficient value will provide a flashing current through the lamp for indicating the presence of ice in the gap. By reference to the grounded shield element 297 of the transformer, it will be understood that the presence of this element prevents electrostatic coupling and provides a safety feature in event the ignition wire insulation is punctured at the pick-up sleeve 302; it will be understood that the present indicating circuit is generally safer in use than the bridge-type circuits of Figures 3 and 4.

By reference to the circuit diagram of Figure 25, it will be noted that a typical present balanced indicator circuit would be one in which the effective capacity of the condenser 298 is 15 micromicrofarads (15 mmf.) balances the effective capacity of the ice detection condenser and its advantageous relatively short connections with the transformer secondary coil 295. In such a typical circuit, the capacities of the ice detection condenser and of the connections thereto might be 7 mmf. and 8 mmf. respectively. When, however, ice, which has a relatively high dielectric constant, is deposited on and between the outer face of the element 277 and the bore 276 of the nozzle 274, the capacity of the latter condenser assembly increases as the effective air gap is decreased to finally so unbalance the circuit through the secondary coil as to effect a flashing energizing of the glow lamp 304 for indicating the deposit of the ice; a quarter-watt neon tube will flash when the energizing voltage across the lamp exceeds about 60 volts. Also, by reason of the fact that the present electrode 277 and the nozzle bore lack insulation on their mutually opposed faces, the conductivity of the deposited ice after it has closed the gap will positively and markedly increase the circuit-unbalancing action to provide a maximum and unmistakable glowing of the signal lamp. The single signal connection for the present unit provided at the support plate 282 may, of course, be connected in a selective indicator circuit such as that disclosed in Figure 4.

Considering the various disclosed forms of the present ice detection condensers, it will be understood that the normally effective air gaps may be structurally predetermined, and that the minimum ice deposit in a gap G for which a signal will be provided is controlled by the effective gap as predetermined by the spacing and surface areas of the cooperative electrode elements, and by the characteristics of the other elements of the indicator circuits.

While the present dielectric gap device for detecting an unwanted formation of ice specifically discloses the use of a glow tube as an indicating means, it will be understood that an indicating or recording voltmeter might be substituted for a glow tube or be connected in parallel with the tube as an ice-formation indicator means. A suitable deicing apparatus (not shown) would be provided for use in removing the ice whose presence is indicated by the present device, and may be automatically operable with the indicating device. Furthermore, while the present dielectric gap device has been particularly disclosed as applied to the carburetor and exposed surfaces of an airplane, it will be understood that the principle and circuit may be applied in the indication and/or measuring of the thickness of deposits or formation of other solid material than ice in a given zone. Thus, the device might be readily adapted for use in determining the moisture content of materials such as lumber or paper, or the degree of concentration or specific gravity or composition of materials introduced in a gap G provided between suitably related gap-providing elements.

From the foregoing description taken in connection with the accompanying drawings, the advantages of the present icing detection device features will be readily understood by those skilled in the art to which the invention appertains. While I have described the principle of operation, together with arrangements which I now consider to be the preferred embodiments thereof, I desire to have it understood that the showings are primarily illustrative, and that such changes and developments may be made, when desired, as fall within the scope of the following claims.

I claim:

1. In means for indicating the formation of ice in a zone subject to icing conditions and normally occupied by a gaseous mixture including water vapor as the source of the ice which may be formed in the zone, a condenser disposed in said zone and providing a dielectric gap arranged for the formation of ice therein under icing conditions in the zone, a balancing condenser disposed outside of said zone, a transformer disposed outside of said zone and having its secondary coil connected in a circuit including said condensers at the opposite coil ends, a source of oscillating electrical energy connected with the primary coil of the transformer for energizing the same, and an electrically actuatable means for automatic actuation having one terminal connected to said secondary coil at an intermediate point thereof and having its other terminal connected to the condenser terminals not connected to the secondary coil.

2. In means for indicating the formation of ice in a zone subject to icing conditions and normally occupied by a gaseous mixture including water vapor as the source of the ice which may be formed in the zone, a condenser disposed in said zone and providing a dielectric gap arranged for the formation of ice therein under icing conditions in the zone, a balancing condenser disposed outside of said zone, a transformer having its secondary coil connected in a circuit including said condensers, a source of oscillating electrical energy connected with the primary coil of the transformer for energizing the same, and an electrically actuatable means for automatic actuation by deriving its actuating energy from the secondary of said transformer as a function of the formation of ice in said gap.

3. A structure in accordance with claim 2 in which the source of electrical energy for the transformer primary derives its power from the conductor of an ignition system for a combustible mixture.

JOHN E. LINDBERG.

REFERENCES CITED

The following references are of record in the file of this patent:

UNITED STATES PATENTS

| Number | Name | Date |
|---|---|---|
| 2,253,026 | Godsey, Jr. | Aug. 19, 1941 |
| 2,419,266 | Kliever et al. | Apr. 22, 1947 |
| 2,426,625 | Lindberg | Sept. 2, 1947 |
| 2,432,669 | Kliever | Dec. 16, 1947 |
| 2,457,085 | Kliever | Dec. 21, 1948 |